United States Patent
Bolusset et al.

[11] 3,820,869
[45] June 28, 1974

[54] FOCUSSED IMAGE HOLOGRAPHIC MEMORY

[76] Inventors: Christian S. Bolusset, Kerlerranouet, Perros Guirec; Michel E. Treheux, Pleumeur-Bodou; Francis R. Alard, La Rose des Vents, Ploumilliau; Michel E. Malaboeuf, Lannion, all of France

[22] Filed: Dec. 27, 1972

[21] Appl. No.: 318,802

[30] Foreign Application Priority Data
  Dec. 28, 1971 France .............. 71.47411

[52] U.S. Cl. ................................. 350/3.5
[51] Int. Cl. ................................. G02b 27/00
[58] Field of Search ....................... 350/3.5

[56] References Cited
UNITED STATES PATENTS
3,560,071  2/1971  Silverman et al. ............ 350/3.5

OTHER PUBLICATIONS

Vest et al., Applied Optics, Vol. 9, No. 12, Dec. 1970, pp. 2,810–2,812.
Brandt, Applied Optics, Vol. 8, No. 7, July 1969, pp. 1,421–1,429.
Klimenko, Optics & Spectroscopy, Vol. 26, No. 6, June 1969, pp. 552–555.
Klimenko et al., Optics & Spectroscopy, Vol. 31, No. 5, Nov. 1971, pp. 417–418.

*Primary Examiner*—Ronald J. Stern
*Attorney, Agent, or Firm*—Abraham A. Saffitz

[57] ABSTRACT

Apparatus for recording and retrieving graphical information comprising at least one laser and means for directing onto a light sensitive carrier two collimated beams of laser radiation are employed and superimposed images are recorded. The azimuth angle between the first and second beams is adjusted.

3 Claims, 8 Drawing Figures

22 identical to 12 but in polychromatic or white light white or polychromatic reconstituted image $22(\lambda, \lambda_1, \lambda_2)$

FOCUSSED IMAGE HOLOGRAPHIC MEMORY

The present invention relates to the recording, retrieval and display of graphical data such as signatures, printed typed or manuscript inscriptions, diagrams, drawings or graphs. It makes use of the properties of optical patterns and in particular interference patterns.

More particularly, the invention relates to a system for recording and selecting one graphical datum out of a very large number of such data recorded on a plurality of pattern carriers each carrying superimposed a plurality of optical patterns.

U.S. Pat. application Ser. No. 207,151 filed Dec. 13, 1971 which was refiled as a continuation on Sept. 4, 1973 and now bears Ser. No. 294,302 relates to a system of the type described which utilizes the properties of holography. Holograms on a single carrier are produced by interference between a laser object beam of a certain frequency passing through a transparent object carrying data to be recorded, the beam being perpendicular to the carrier, and a reference beam of coherent light, at the same frequency which can be set to a plurality of discrete positions on a cone whose axis is perpendicular to the carrier, each position of the reference beam corresponding to a respective datum. The reference beam does not pass through the object. To read out, the reference beam, or an equivalent beam which is produced by a laser, is deflected by a prism rotatable about an axis perpendicular to the carrier. Access to a selected hologram is defined by three addresses: two Cartesian or polar coordinates defining, in an array of carriers the hologram carrier containing the hologram sought, and an angle which is the angle of rotation of the prism about its axis, which angle defines the hologram sought, relative to all the others recorded on the same carrier.

Because the system uses a holographic technique, read out or reconstitution of the data requires the use of a coherent source, viz. a laser. This laser can be low-powered if the reconstituted datum is projected into the photocathode of an image tube, which acts as a brightness amplifier. However, the presence of a laser, even a low-powered laser, in the reconstitution system increases its production cost.

The present invention resides in a method of recording and retrieving graphical information, wherein the information is recorded, on a light-sensitive carrier, in the form of an optical pattern formed on the carrier by interference between a first laser radiation beam normal to the carrier and a second laser radiation beam oblique relative to the carrier, at least one of the said beams having traversed a transparent information-carrying object. The recorded information is reconstituted from the optical pattern by directing onto the carrier a parallel beam of polychromatic or white light having the same obliquity relative to the carrier as the said second beam.

The invention also resides in apparatus for recording and retrieving graphical information, comprising: at least one laser and means for directing onto a "light-sensitive carrier a first beam of laser radiation normal to the carrier and a second beam of laser radiation oblique relative to the carrier," and means for supporting in the path of at least one said beam a transparent information-carrying object, whereby interference between the beams will form on the carrier on optical pattern containing the information carried on the object; and a polychromatic or white light source and optical means for directing onto a said carrier a parallel light beam from the said source at an obliquity the same as that of the said second beam thereby to reconstitute the information.

A single pattern carrier can carry a plurality of patterns, just as a plurality of holograms were recorded on a single carrier in the above-mentioned earlier system. The advantage of the present optical system is that reconstitution can be carried out with an ordinary, white light source.

As regards the scientific principles used in the holographic system and the present system, it may be stated that a hologram is obtained by causing a reference beam to phasemodulate the diffraction function of the transparency function of the object obtained by means of an object beam passing through the transparent object, whereas an interference pattern is obtained by amplitude modulation of two beams by a single transparency function or, in other words, by interference between two beams at the same wavelength, both of which have passed through the object.

The invention will now be described in detail by way of example only, with reference to the accompanying drawings, in which.

A system embodying the invention makes use of various properties of optical interference patterns described below with reference to FIG. 1.

Figure 1:
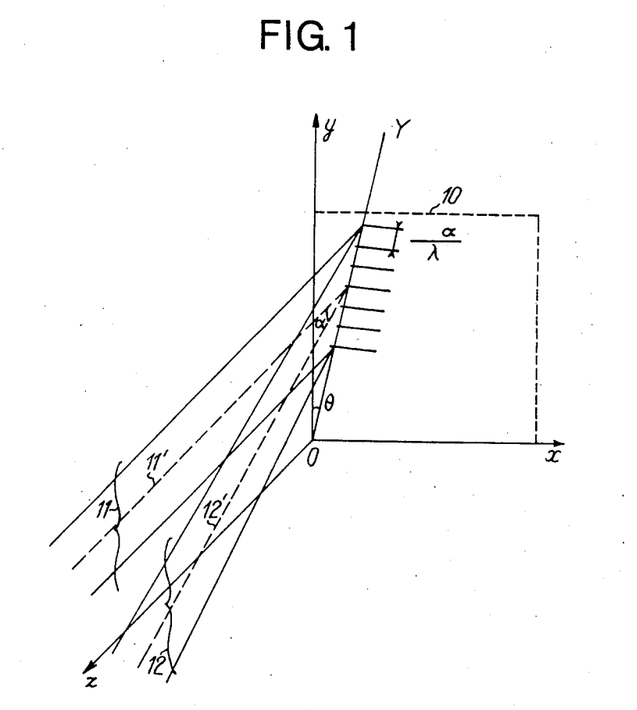
FIG. 1 is a geometrical diagram permitting calculation of the fringe separation of an optical interference pattern as a function of the angular directions of the interfering beams.

FIG. 1 shows two beams 11, 12 of parallel coherent light interfering in a plane $x0y$. The axes 11' and 12' of the beams 11, 12 define a plane $Y0z$ which forms and angle $\theta$ with the plane $y0z$. The axis 11' of the beam 11 is parallel to $0z$ and therefore perpendicular to the plane $x0y$, and the axis 12' of the beam 12 forms an angle $\alpha$ with the axis 11' of the beam 11. It will be appreciated that if the beam 12 describes a cone about the beam 11, $\alpha$ remains constant and $\theta$ varies.

At a point $(x,y)$ in the plane $x0y$, the brightness or luminance interference function $I(x,y)$ takes the form:

$I(x,y) = 2 [1 + \cos(2\pi y/\lambda \sin \alpha \cdot \cos \theta - 2\pi x/\lambda \sin \alpha \cdot \sin \theta)]$ If the plane $x0y$ contains a light-sensitive surface 10 whose response is assumed to be proportional to the brightness $I(x,y)$ and if, moreover, a plane mask having a transparency function $F(x,y)$ (this function will hereinafter be termed the mask function and in practice corresponds to graphical data or information) is placed in the path of the beams 11, 12, the transfer function of the interference pattern, and hence the pattern recorded on the sensitive surface 10 acting as a pattern carrier, will be:

$$R(x,y) = k \cdot F(x,y) \cdot I(x,y)$$

If, for reproduction, this pattern is illuminated with a beam identical to the exposing beam 12 and having the same wavelength, the mask function $F(x,y)$ is reconstituted in the direction 11' by diffraction of the recorded pattern having the transfer function $R(x,y)$. If a wavelength $\lambda'$ different from the wavelength $\lambda$ used during exposure is employed, the mask function $F(x,y)$ will be reconstituted by a beam whose direction is different from the direction 11' and which forms with the direction 11' an angle $\epsilon$ such that:

$$\sin \epsilon = (1 - \lambda/\lambda') \sin \alpha$$

Figure 2:
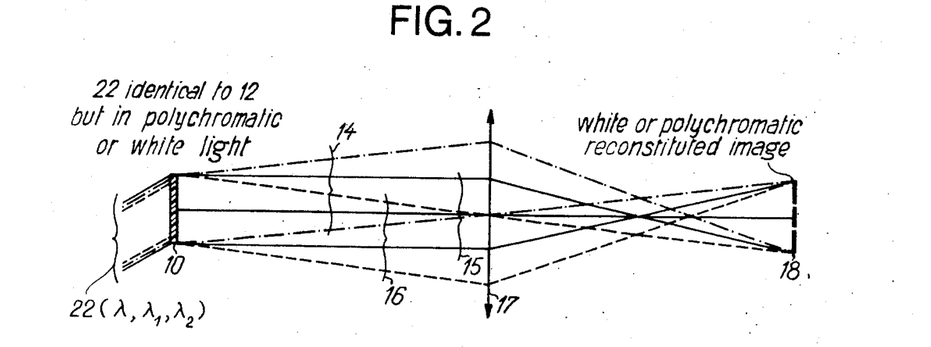
FIG. 2 is an explanatory drawing of the reconstitution of an image from a single interference pattern by polychromatic light.

FIG. 2, which relates to the reconstitution in polychromatic light of a single pattern, shows the plane pattern carrier 10 in the form of a plate, aligned with axes $0x$, $0y$, the plate being assumed to be illuminated with a polychromatic beam 22 composed of light at three wavelengths $\lambda, \lambda_1, \lambda_2$. The mask function $F(x,y)$ is then reconstituted in the three directions 14, 15, 16 respectively corresponding to $\lambda, \lambda_1, \lambda_2$. If an aberration-free lens or optical system 17 is placed behind the plate 10, the mask function $F(x,y)$ carried by each of the beams 14, 15, 16 will give, in the plane 18 conjugate with that of the plate 10 relative to the optical system 17, this plane 18 being assumed to be aligned with axes $0x$, $0y$ parallel to those of the plate 10, an image with a transparency function $F(gx,gy)$ reconstituted with the three colors $\lambda, \lambda_1, \lambda_2$; $g$ designates the magnification due to the optical system 17.

The information carried by the mask, that is, the mask function $F(x,y)$, is therefore reconstituted in polychromatic light and therefore also in white light.

Figure 3:
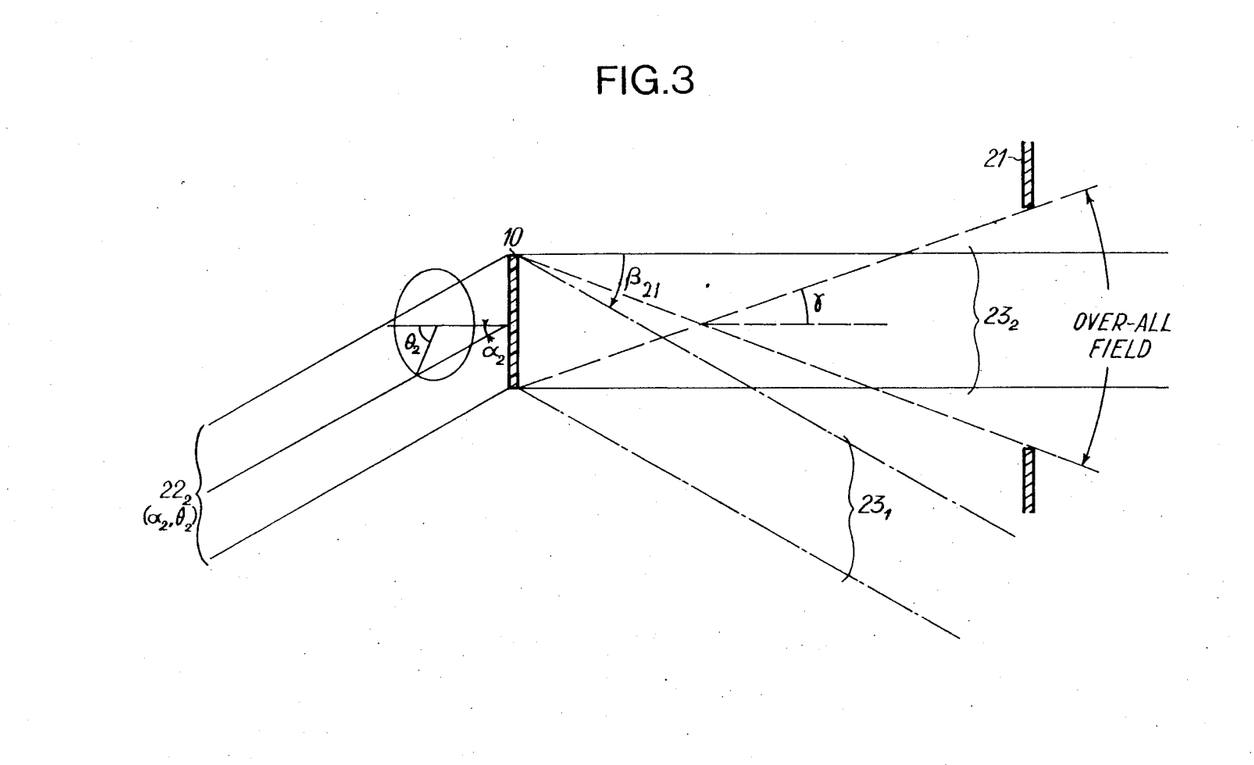
FIG. 3 is an explanatory drawing of the reconstitution of images from two interference patterns formed on a single pattern carrier.

FIG. 3 concerns the case in which two mask functions $F_1(x,y)$ and $F_2(x,y)$ have been recorded on the same pattern carrier plate 10, in the form of two patterns having transfer functions $R_1(x,y)$ and $R_2(x,y)$. The two patterns have seen recorded at the same wavelength, the beam 11 normal to the carrier being the same in both cases, and the oblique beam 12 being, in the case of the first pattern ($R_1$), a beam $E(\alpha_1, \theta_1)$ with angular parameters $\alpha_1$ and $\theta_1$ and, in the case of the second pattern ($R_2$), a beam $E(\alpha_2, \theta_2)$ with angular parameters $\alpha_2$ and $\theta_2$ (beam $22_2$).

The total resulting transfer function of the recorded patterns takes the form:

$$S(x,y) = R_1(x,y) + R_2(x,y) = k[F_1(x,y) I_1(x,y) + F_2(x,y) I_2(x,y)]$$

If the pattern carrier 10 is illuminated by means of a beam $22_2$, $E(\alpha_2, \theta_2)$, having the same angular parameters as the beam used for exposure of the second mask ($F_2$), the reconstitution function is:

$$F_1(x,y) \cdot I_1(x,y) \cdot E(\alpha_2, \theta_2) + F_2(x,y) \cdot I_2(x,y) \cdot E(\alpha_2, \theta_2)$$

The second term represents the normal response of the second pattern, that is, it relates to the reconstituted image of the mask $F_2(x,y)$ carried by the beam normal to the pattern carrier. The first term corresponds to the image of the mask $F_1(x,y)$ carried by a beam $23_1$ which forms with the normal to the carrier an angle $\beta_{21}$ such that:

$$\sin \beta_{21} = \sin \alpha_2 \cos (\theta_2 - \theta_1) - \sin \alpha_1$$

If $\gamma$ represents the half-angle of the total field limited by the edges of the pattern carrier 10 and on the edges of a stop 21, the reconstituted images of the masks $F_1(x,y)$ and $F_2(x,y)$ can be separated if $\beta_{21} > \gamma$, because beam $23_1$ is blocked.

The diameter of the aperture of stop 21 is determined by the dimensions of the pattern carrier and by the laws of diffraction applied to the smallest detail to be recorded and reproduced.

Similarly the image of mask $F_1(x,y)$ can be reconstituted and the image of mask $F_2(x,y)$ blocked if reconstitution is effected by means of a beam having parameters $\alpha_1, \theta_1$, and:

$$\sin \beta_{12} = \sin \alpha_1 \cos (\theta_1 - \theta_2) - \sin \alpha_2$$

and $$\beta_{12} > \gamma$$

The two mask functions recorded on a single carrier can therefore be separately reconstituted by the use of beams corresponding to the oblique beams respectively used to record the corresponding patterns.

In practice, for simplicity, $\alpha$ is kept constant so that the reconstitution beams occupy positions on a cone, and discrete reconstitution beam azimuth positions on the cone are selected corresponding to discrete values of $\theta$. Each such positions corresponds to a respective recorded pattern and a corresponding reconstituted image.

Data recording and retrieval apparatus based on the principles described above is shown in FIGS. 4 to 8. A plurality of items of data is recorded on a common carrier as interference patterns each corresponding to a respective discrete value of angle $\theta$.

Figure 4:
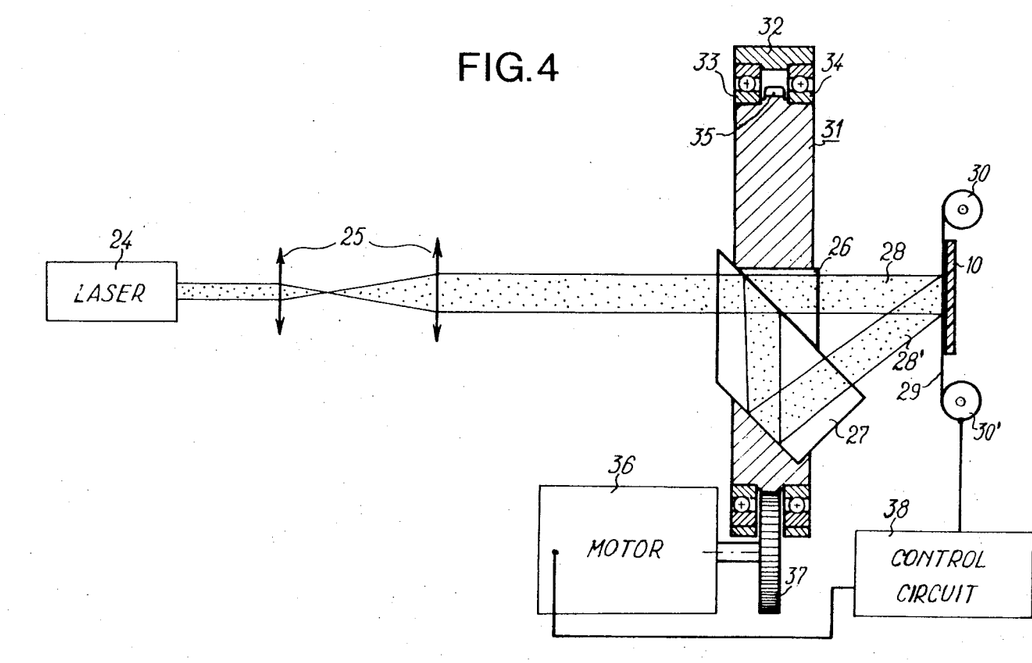
FIGS. 4, 5 and 6 represent apparatus for exposing a plurality of patterns on a single pattern carrier.

FIG. 4 shows a data recording arrangement, comprising a laser 24 and an optical system 25 which converts the parallel beam from the laser into a parallel beam with dimensions suitable for illuminating the whole of an object carrying information to be recorded. The beam emerging from the optical system 25 falls onto a beam-splitting prism assembly formed of a triangular prism 26 and a quadrangular reflector prism 27, which assembly splits the beam into a direct beam 28 normal to the light-sensitive pattern carrier plate 10 and an oblique beam 28' which also falls on the pattern carrier 10. The information-carrying object is a film 29 placed against the plate 10 and which can be wound from a supply spool 30 to a take-up spool 30'.

The arrangement shown in FIG. 4 corresponds broadly to FIG. 1: beams 28 and 28' correspond to the beams 11, 12 and interfere at the carrier plate 10; the interference pattern is modified by the graphical information on the film 29, which acts as the mask referred to in relation to FIG. 1; the pattern recorded on carrier plate 10 therefore represents the information on the flim 29; the pattern also depends on the value of angle $\theta$ i.e., to the angular orientation or azimuth of the prism assembly about an axis of rotation coincident with beam 28; the angle $\alpha$ between beams 28 and 28' is fixed.

To enable a plurality of different patterns to be recorded on one carrier, $\theta$ can be set to different discrete values by rotation of the prism assembly about the said axis. To this end, the prism assembly 26, 27 is mounted on a movable member 31 which is mounted rotatably in a mounting 32 by means of ball bearings 33, 34. The member 31 has an external toothed rim 35, which is driven by a motor 36 through a pinion 37. The motor 36 is a stepping motor controlled, as is the film feeding system, by a control circuit 38.

Figure 5:
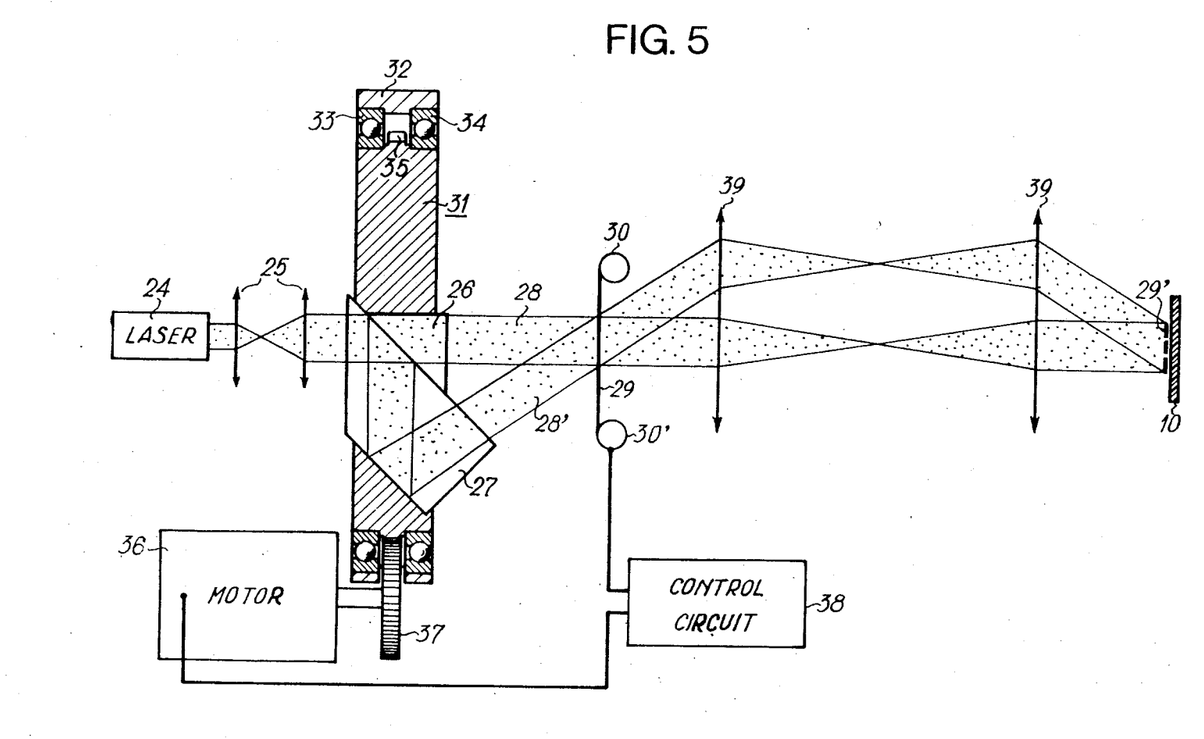

In the recording arrangement shown in FIG. 5 the mask or transparent object 29, instead of being in contact with the pattern carrier plate 10, is imaged onto the surface of the carrier at 29' by an optical system 39. The direct beam 28 normal to the plate and the beam 28' oblique relative to the plate both pass through the transparent object 29 and its image 29'. In other respects the arrangement is similar to that of FIG. 4.

Figure 6:
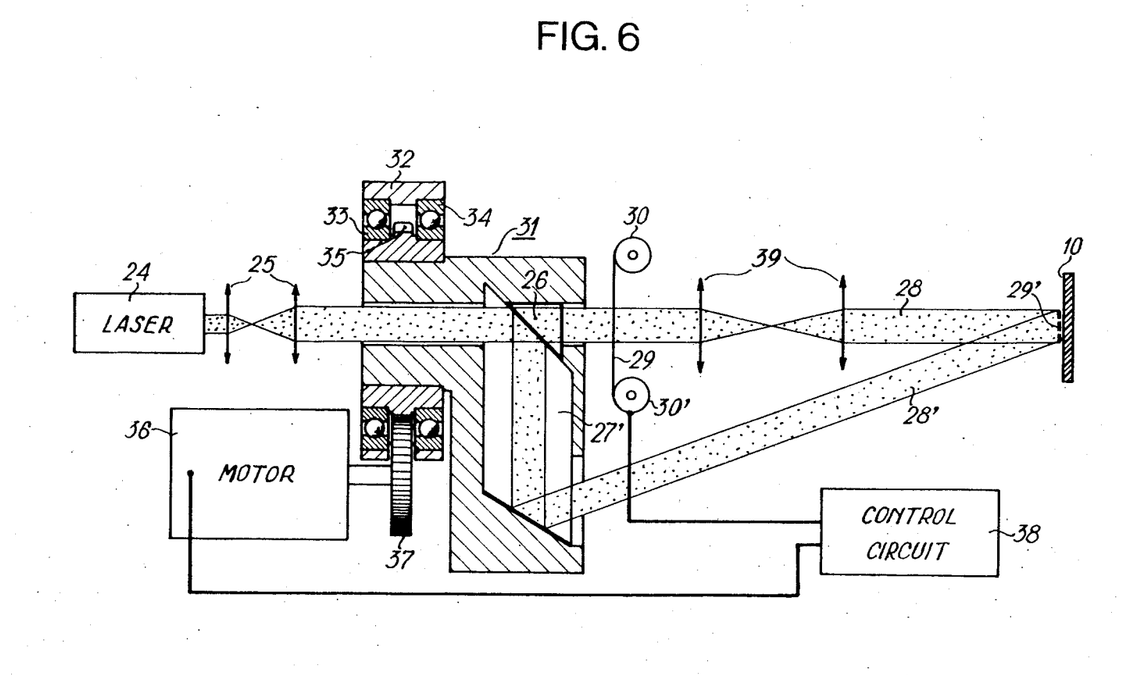

FIG. 6 differs from FIG. 5 only in that the beam 28 normal to the plate 10 passes through both the transparent object 29 and its image 29', whereas the beam 28' oblique relative to the plate does not pass through the object 29 but does fall on the image 29'. To provide the necessary increased lateral offset of beam 28', a deflecting prism 27' longer and of different shape from prism 27 is used.

In the system shown in FIG. 6 the result is the same as in FIGS. 4 and 5, since only places illuminated through the transparent object 29 and transferred to the image at 29' form a recorded pattern. The non-transmissive parts of the object, instead of producing black, give rise to a continuous diffuse background on the plate 10 due to the oblique beam, and this continuous background can be eliminated during processing of the plate.

When patterns corresponding to different objects have been recorded on the same light-sensitive plate 10, the latter is developed and fixed. If the light-sensitive plate is a photographic plate, the ordinary developing process may advantageously be followed by bleaching to increase the diffracting power of the patterns recorded.

Figure 7:
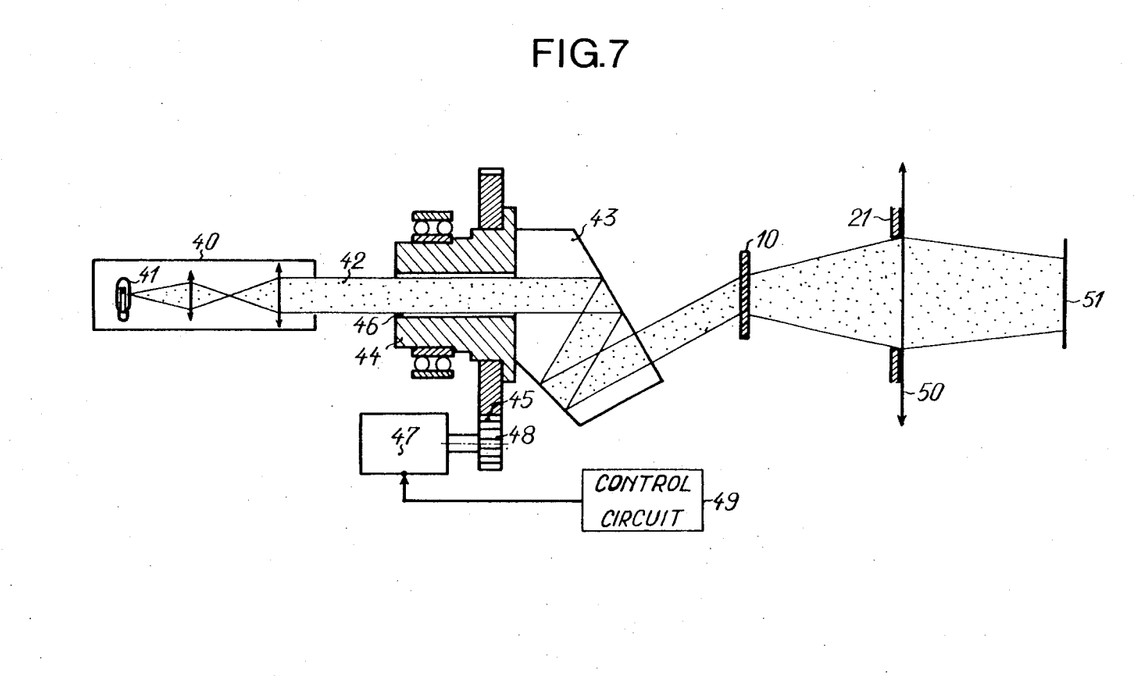
FIG. 7 illustrates data reconstitution apparatus.

FIG. 7 illustrates reconstitution apparatus using the principles described with reference to FIG. 3. It consists essentially of means of directing onto the pattern carrier plate 10 a beam of white light having the same obliquity relative to the plate as the oblique beam 28' used for recording the patterns on the plate, and means for adjusting the angular setting $\theta$ of this white light beam about an axis normal to the plate in order to select a desired pattern for reconstitution and display.

A collimator 40 with a white light source 41 produces a collimated beam 42 which falls onto a pentaprism 43 mounted on a rotary member 44. The prism 43 offsets the beam laterally and deflects it obliquely so that it falls on the pattern carrier plate 10 at the angle $\alpha$ used when recording.

The rotary member 44 has a hollow shaft 46 normal to the plate 10, along which shaft the beam 42 passes. The member 44 has a toothed rim 45 driven by a motor 47 through a pinion 48. The motor is operated by a control circuit 49 which enables it to be set in motion and stopped in a selected one of a plurality of discrete angular positions.

The beam diffracted by the recorded pattern thus selected is limited by the stop 21 to block unwanted image as described above, and the desired image is projected onto a screen 51 or onto the photocathode of an image tube.

Figure 8:
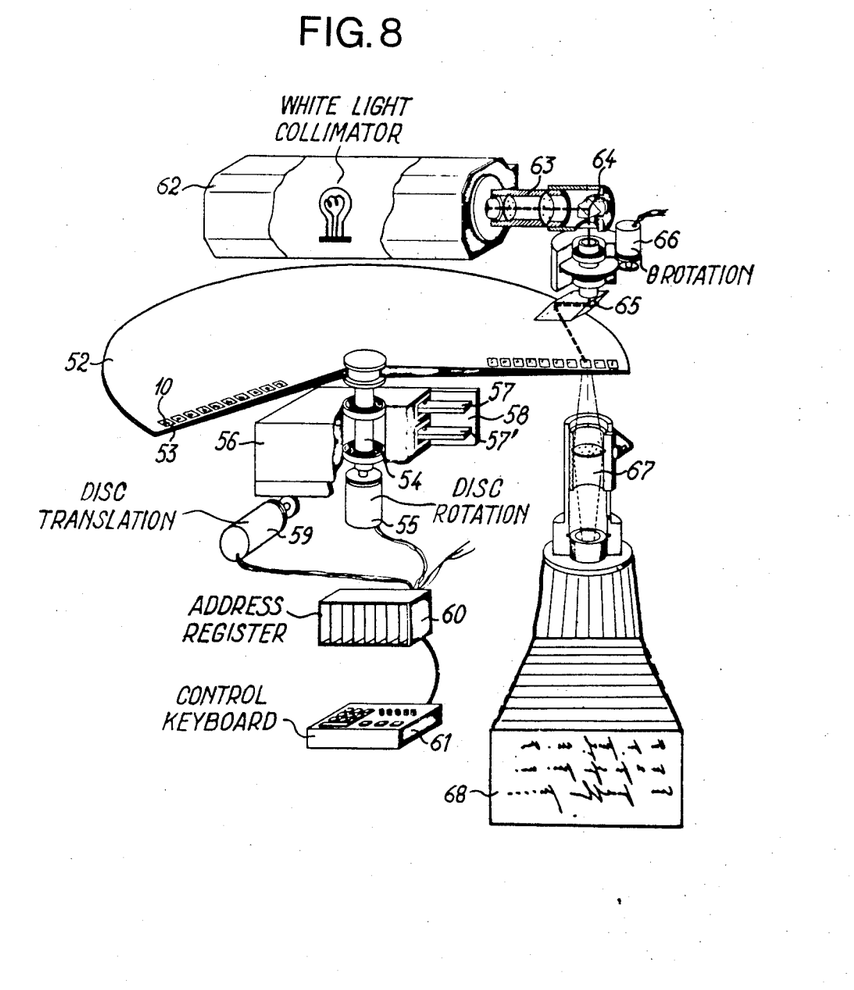
FIG. 8 illustrates apparatus for selecting recorded data and rendering the selected datum visible.

In the apparatus shown in FIG. 8 photographic plates 10, each bearing a plurality of recorded patterns, are arranged in apertures 53 in a circular disc 52. The disc can be turned on a shaft 54 by means of a motor 55. The motor 55 is mounted on a movable carriage 56 slidable normal to the shaft axis along rails 57, 57' attached to a fixed base 58. The carriage 56 can be slid along the rails 57, 57' by means of a motor 59 attached to the base. The motors 55, 59 are either stepping motors or servo-motors, and receive respectively from an address register 60 positioned by means of a keyboard 61 an angular address, which controls the motor 55, and a radius address which controls the motor 59. The plates 10 are arranged in a two dimensional array so that any plate can be accessed by means of a two-cordinate polar address. The control means therefore enables a plate 10 having specified cordinates to be positioned under a white light beam for data reconstitution as described with reference to FIG. 7.

A white light collimator 62 supplies the reconstitution or read-out beam. This beam passes horizontally through an afocal optical system 63 before falling on a prism 64, which deflects it vertically downwards. The beam then falls onto a rotary deflector prism 65 corresponding to prism 43 in FIG. 7. The prism 65 is rotated by a motor 66 to a selected angle setting in accordance with an angular pattern address sent from the address register 60 to the motor 66, to select a desired pattern on the selected plate 10.

The beam passes through the selected pattern carrier platz 10 and then a lens 67, which projects the reconstituted image of the recorded data onto a ground glass screen 68 in the plane conjugate with that of the pattern, relative to the lens 67.

What we claim is:

1. Apparatus for recording and retrieving graphical information comprising at least one laser and means for directing onto a light sensitive carrier a first collimated beam of laser radiation from said laser normal to the carrier and a second collimated beam of laser radiation from said laser which is mutually coherent with said first beam and is oblique relative to the carrier, a transparent information carrying object, means for supporting in the path of both said beams said transparent information carrying object, means for forming superimposed images of said object from each of said beams for recording superimposed focussed images, whereby interference between the beams will form on the carrier an optical pattern containing the information carried on the object, means for adjusting the azimuth angle of the second beam about an axis coincident with the first beam for recording other information bearing objects, and a polychromatic light source and optical means for directing onto the said carrier a parallel light beam from said source thereby to reconstitute the information.

2. Apparatus as claimed in claim 1 wherein said means for forming superimposed images consists of means for holding said information object and said light sensitive carrier in contact with each other for producing a contact print.

3. Apparatus as claimed in claim 1 wherein the object supporting means is spaced from the carrier and further comprising optical means for imaging the object in both beams on said carrier.

* * * * *